Aug. 22, 1933.  B. McCOLLUM  1,923,107
SEISMIC METHOD OF PROFILING GEOLOGIC FORMATIONS
Filed Feb. 5, 1931

Burton McCollum INVENTOR.

Patented Aug. 22, 1933.

1,923,107

UNITED STATES PATENT OFFICE 1,923,107

SEISMIC METHOD OF PROFILING GEOLOGIC FORMATIONS

Burton McCollum, Houston, Tex., assignor, by mesne assignments, to The Texas Company, a Corporation of Delaware Application February 5, 1931. Serial No. 513,559

5 Claims. (Cl. 181—0.5)

My invention relates to a geophysical method of investigating geologic formations. More specifically, my invention consists in a seismic method of profiling the boundary surfaces of subterranean geologic formations. My method is particularly adapted to determining the position of very steep or substantially vertical boundary surfaces such, for example, as are found on the flanks of salt domes, igneous intrusions, dikes, etc. It will be obvious from the specification that other steep boundary surfaces such as fault planes and the steep surfaces of overturned folds can be accurately determined by the invention described. As will appear from the specification, however, steepness of the boundary surface or contact is not essential to operativeness of the invention. This merely being a feature of the invention in that the difficulty of profiling very steep or vertical surfaces of geologic formations has heretofore been a serious limitation of seismic methods of profiling.

While my method is capable of indicating the presence or absence of geologic formations, such is not the essence of my invention. The essence of my invention consists in a method of profiling with practical accuracy the boundary surface of a formation which, in most instances, is already known to exist. The profiling of these boundary surfaces is a matter of considerable practical and economic importance as will appear from the specification and accompanying drawing which illustrates diagrammatically and by way of example the basic principles and applications of my invention.

Figure 1:
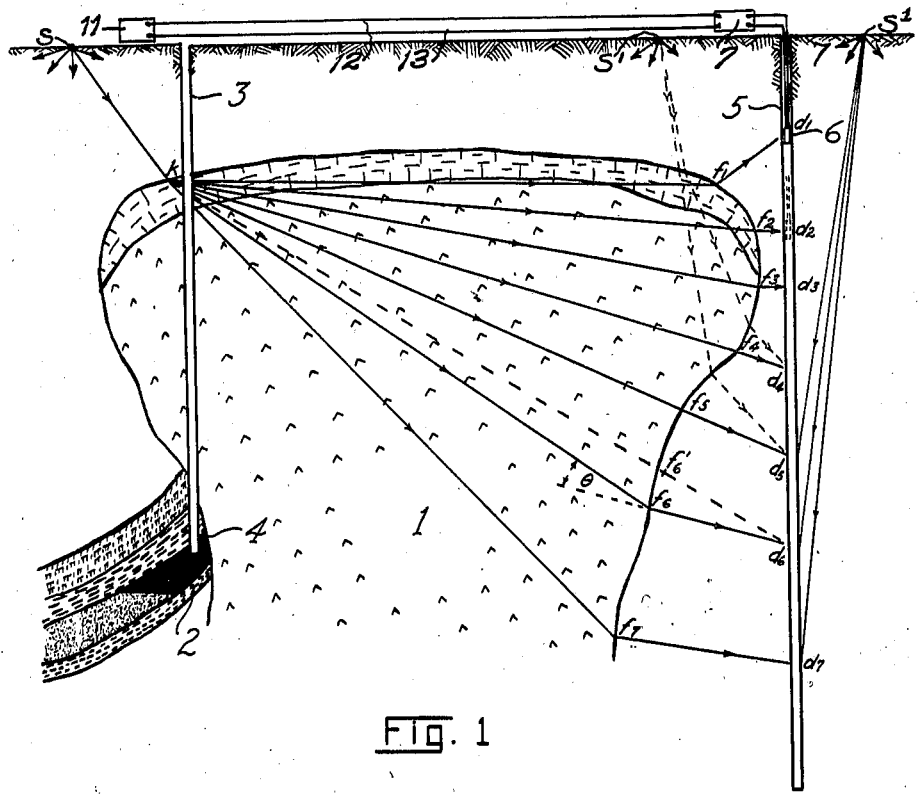
Fig. 1 is a diagram illustrating a practical application of my invention.

By way of illustrating the practical importance of my invention, I have shown in Fig. 1 a typical oil bearing formation adjacent the flank of a "mushroom" salt dome. In the figure the dome is designated by 1 and the oil bearing formation by 2. It is well known in the petroleum producing art that, because of hydrostatic pressure and water-oil displacement principles, the optimum location for a well to produce oil from the deposit 2 would be such that the bore hole would tap the deposit near its highest point as, for example, well 3. As will be seen on reference to Fig. 1, the highest point of the deposit 2 lies adjacent the flank 4 of the salt dome. It therefore becomes a matter of considerable practical and economic importance to profile the flank of the dome, or in other words, to determine the position of a series of points on the flank 4 with reference to some known point on the surface of the ground. A method of developing such a profile is the essence of my invention.

The basic principles of my profile method will be understood on reference to Fig. 1 of the drawing together with the following description:

In Fig. 1 a source of sound energy is shown at $s$. This source may be a buried charge of explosive such as will generate elastic waves in the earth when fired, or it may be other means for generating such waves, as an elevated weight, for example, which will produce seismic waves when dropped on the ground. In general I prefer buried explosives, though other means for producing seismic waves may be used. At the position $d_1$ in the bore hole 5 is shown means 6 for detecting seismic waves. I call such seismic wave detecting means a detector. The detector is shown connected by means of electrical conductors to a recorder 7 on the surface of the earth, though the detector and recorder may be component parts of a single instrument capable of being lowered into the bore hole as a unit. The detector 6 may be adjusted to various positions in the bore hole as, for example, $d_2$ and $d_3$ to $d_7$ by means of a hoisting winch and cable to which the detector is attached. I have used such detectors lowered into bore holes to depths approximating one and a half miles, though my apparatus is capable of being used at greater depths.

After having lowered the detector 6 into the bore hole 5 to some definite position, as, for example $d_6$, a charge of explosive buried at $s$ is fired. The time of firing is transmitted to the recorder 7 by wire or radio means well understood in geophysical art. I have indicated this generally by a local device 11 adapted to be influenced by sound or voltage to cause electric signals to be transmitted through wires 12 and 13 to the recorder 7 at the station. Coincident with the time of firing of the buried explosive a seismic wave will originate at the point $s$ and will be transmitted in all directions through the surrounding geologic formations. In accordance with the well known laws of transmission of elastic waves through solid media, that portion of the wave traversing the path $sk f_6 d_6$ will reach the point $d_6$ in the shortest possible time. When the wave reaches the point $d_6$ it will actuate the detector 6 and its exact time of arrival will be recorded by 7.

Having recorded the time of origin of the seismic wave at $s$ and the time of its arrival at $d_6$, I have determined the time $T$ required for the seismic wave to traverse the path $skf_6d_6$. I next utilize methods taught the art by my Patents Nos. 1,724,495, 1,724,720 and Reissue No. 17,242 in determining the time $t_1$ required for the seismic wave to traverse the path $sk$.

Then, $$T - t_1 = t_2 + t_3 \qquad (1)$$

in which $t_2$ is the time required for the wave to traverse the path $kf_6$, and $t_3$ the time required for the wave to traverse the path $f_6d_6$.

Therefore, $$T - t_1 = \frac{kf_6}{v_s} + \frac{f_6 d_6}{v_6} \qquad (2)$$

in which $v_s$ is the velocity of the seismic wave in the formation traversed by path $kf_6$. The velocity $v_s$ is determined by methods well known in the art and taught by my above mentioned patents. The velocity of seismic waves along the various paths $f_5d_5$, $f_6d_6$, and $f_7d_7$, for instance, will, in general, be different. This is due, among other factors, to a difference in consolidation of the softer geologic formations adjacent to the flank of the dome. It is, therefore, necessary to make a special determination of the velocity $v_6$ for the path $f_6d_6$. This is accomplished by determining the mean velocity of the seismic wave in the geologic formations surrounding $d_6$. The determination of $v_6$ is made as follows: Explosive is fired at a point $s_1$, on the surface near the bore hole, and the time $T_5$ required for the seismic wave to traverse the path $s_1d_5$ is recorded. In like manner the times, $T_6$ and $T_7$, required for a seismic wave to traverse the paths $s_1d_6$ and $s_1d_7$, respectively, are recorded. Then if $s_1$ is sufficiently near the bore hole to make angle corrections unnecessary:

$$v_6 = \frac{\frac{d_5d_6}{T_6-T_5} + \frac{d_6d_7}{T_7-T_6}}{2} \qquad (3)$$

In the triangle $kf_6d_6$ $$kd_6^2 = kf_6^2 + f_6d_6^2 + 2(kf_6)(f_6d_6) \cos \theta \qquad (4)$$

When $\theta$ is small, as it will be in general, cosine $\theta$ closely approaches unity and can be considered unity in most profile problems without affecting the practical accuracy of the desired results. Equation (4) then becomes:

$$kf_6 = kd_6 - f_6d_6 = kd_6 - f_6'd_6 \qquad (5)$$

since $f_6d_6$ and $f_6'd_6$ will be equivalent for all purposes of practical accuracy when $\theta$ is small.

Substituting $kd_6 - f_6'd_6$ for $kf_6$ in Equation 2 gives:

$$T - t_1 = \frac{kd_6 - f_6'd_6}{v_s} + \frac{f_6'd_6}{v_6} \qquad (6)$$

or $$f_6'd_6 = \frac{v_6[(kd_6 - v_s(T-t_1)]}{v_6 - v_s} \qquad (7)$$

In this equation all factors are known with the exception $kd_6$ which obviously can be determined analytically or graphically since the position of $d_6$ is known and $sk$ has been determined by methods shown in my above mentioned patents. Having determined $f_6'd_6$ I have, of course, determined the position of $f_6'$ which approximates $f_6$ with sufficient accuracy for most practical purposes, such, for example as the making of a bore hole location. The approximate positions of $f_1$ to $f_5$ and $f_7$ are determined in a manner similar to that by which $f_6$ was determined. This results in a profile of the geologic formation that is sufficiently accurate for the development of mineral deposits associated with the profiled surface. A determination of the position of $f_6$ with accuracy approaching the absolute requires additional sets of computations involving functions of the angle of refraction $\theta$, which is in turn dependent, among other factors, on the approximate profile first developed. Such computations are well understood by those versed in the art of geophysics.

It will also be obvious to those skilled in the art of seismology that the position of the shot point $s$ may, at times, be shifted with advantage as for example $s'$; and that the shot and detector are inter-changeable in position without involving the principles of my invention. In some instances the shot $s$ may also be placed in a deep bore hole with certain advantages. For example, if the shot $s$ was placed in bore hole 3 near the point $k$ the time $t_1$ would be eliminated from the computations. It should also be understood that my invention is not restricted to the specific mathematics used in the specification but that other mathematical analysis of the basic data are obvious to those skilled in the art. It is further apparent that the position of the detector 6 may not always be vertically below the surface location of the bore hole 5, as such holes sometimes deviate from a true vertical course; and that when this occurs, it will be necessary to determine the course of the bore hole by any one of several well known methods.

Figure 2:
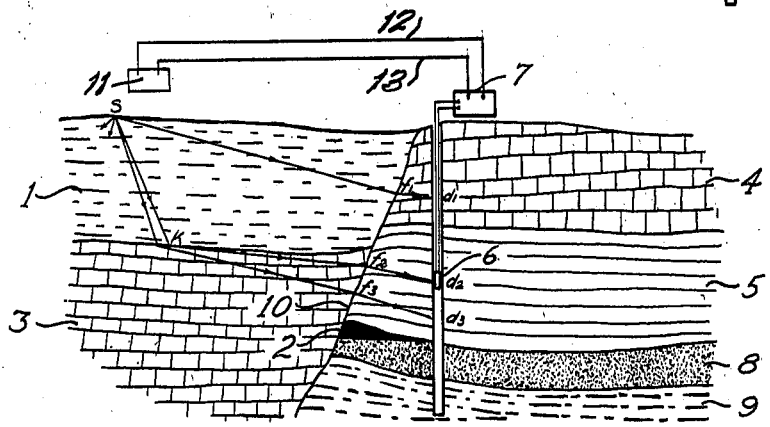
Fig. 2 illustrates another application of my invention.

By way of illustrating the broad scope of my invention, I have shown in Figure 2 how it may be applied to the profiling of a fault plane. In this case the problem consists in determining the position of the fault plane 10 or, more specifically, the profiling of the surface of contact of the formations 1 and 3 with the formations 4, 5, 8 and 9. Such a profile would be desirable for the purpose of locating a bore hole to tap the oil bearing formation 2 at its highest point. In profiling the fault plane or surface 10, the points $f_1$, $f_2$ and $f_3$, for example, could be determined by the methods taught in the description of Fig. 1.

While I have shown oil bearing formations in the drawing, my invention is obviously not restricted to the profiling of surfaces adjacent to oil bearing formations; but may be applied to the profiling of other geologic surfaces with which valuable mineral deposits may be associated.

I claim:

1. In the art of investigating geological formations, the method which consists in producing a seismic wave in the earth's substance, detecting the arrival of the wave at a point in the earth's substance, producing a seismic wave above said point and detecting the arrival of the second mentioned wave at two spaced points adjacent the first mentioned point.

2. In the art of investigating geological formations, the method which consists in producing a seismic wave in the earth's substance, detecting the arrival of the wave at a point in the earth's substance, producing seismic waves above said point and detecting the arrival of the waves at points substantially equally and oppositely spaced from the first mentioned point.

3. In the art of locating points on the surface between two dissimilar subterranean substances, the method which consists in producing seismic waves in the earth's substance to pass through one substance and into the other, detecting the arrival of the waves at points in a substantially vertical line in such other substances, producing seismic waves to pass substantially vertically through said points and detecting the arrival of the second mentioned waves at said points.

4. In the art of investigating geological formations, the method which consists in producing seismic waves in the earth's substance, detecting the arrival of the waves at a plurality of points in a substantially vertical line, producing seismic waves to pass substantially vertically through said points and detecting the arrivals of the second mentioned waves at said points.

5. In the art of investigating geological formations, the method which consists in producing seismic waves in the earth's substance, detecting the arrival of the waves at a plurality of points at different depths in the earth's substance, producing seismic waves at a surface point substantially in line with all said points and detecting the arrival of the second mentioned waves at such points.

6. In the art of locating points on a surface between two dissimilar subterraneous substances having a well at one side of said points, the method which consists in producing seismic waves at the other side of said points, detecting the arrivals of the waves at superposed loci in said well, transmitting to a recorder signals of times of origin and arrivals of the waves at said loci and recording the times of arrival of said signals.

7. In the art of locating points on a surface of a subterranean geological formation having a well therein, and another well in the earth's substance outside of said formation, the method which consists in producing a seismic wave in the first mentioned well, detecting the arrival of the wave at a locus in the second well, transmitting signals of the time of origin and arrival of the waves at said locus and recording the times of arrivals of the signals at a predetermined station.

8. In the art of locating a point on the surface of a geological formation, the method which consists in producing a seismic wave to pass through said formation, recording the time of travel of the wave to a locus in the earth's substance on the other side of the formation, determining the distance between the origin of the wave and the point of entry into said formation, producing seismic waves substantially vertically above said locus, recording the times of travel of the second mentioned waves to spaced points adjacent said locus, and locating the point at which the first mentioned wave emerges from said formation.

BURTON McCOLLUM.